Patented June 30, 1953

2,643,977

UNITED STATES PATENT OFFICE 2,643,977

METHOD OF INHIBITING CORROSION OF METALS

William B. Hughes, Bartlesville, Okla., assignor to Cities Service Research and Development Company, New York, N. Y., a corporation of New Jersey No Drawing. Application January 29, 1951, Serial No. 208,451

6 Claims. (Cl. 252—8.55)

This invention relates to inhibiting corrosion of metals and is more particularly concerned with improved compositions and processes for treating natural petroleum oil-brine mixtures to reduce their corrosive action upon production, transmission, storage and other oil field equipment.

It is a well-known fact that many oil producing formations yield with the crude oil a brine which is extremely corrosive in its action upon metal tubing, casings, pumps, and other oil producing and collection equipment, and that this type of corrosion is particularly noticeable in wells producing brines containing dissolved hydrogen sulfide, carbon dioxide, or other acidic materials.

Various compositions have been proposed in the past for inhibiting such corrosion, some water-soluble, and some oil-soluble. Since it has been found that if a sufficient amount of inhibitor is incorporated into either the brine phase or the oil phase of the well fluids, corrosion may be substantially inhibited, it has been the practice to use water-soluble inhibitors, such as those disclosed in U. S. Patent 2,496,596 to Moyer and Hersh, in wells producing only small amounts of brine per barrel of well fluid, and conversely, oil-soluble inhibitors in wells producing only small amounts of oil per barrel of well fluid. By so proceeding it is possible to reduce to a minimum the amount of inhibitor required to effectively reduce corrosion.

It is an object of this invention to provide a series of oil-soluble compounds which are highly effective in reducing corrosion in wells producing corrosive brines, and particularly useful for substantially preventing corrosion in wells producing but small quantities of oil per barrel of well fluid.

I have discovered that products having the above desirable characteristics may be produced by first reacting diethylenetriamine with an equimolar quantity of an aldehyde, heating to drive the reaction to completion and to take overhead water formed in the reaction, and then reacting the polyamine-aldehyde reaction product with a further mol of aldehyde. It is believed that the initial product formed by the reaction of the first mol of aldehyde and the diethylenetriamine is an imidazolidine, and the final product formed by the reaction of the intermediate product with the second mol of aldehyde combines both the imidazolidine and the imide structures. However, reactions of this type may take such various forms that I do not wish to be bound in this application to any particular structure.

It has been found that there is some choice in the type of aldehyde which is used in the first reaction to form the intermediate product, and that it may be either an aliphatic aldehyde, such as formaldehyde, acetaldehyde, propionaldehyde, butyraldehyde, heptaldehyde, and higher aldehydes, or an aromatic aldehyde such as benzaldehyde. However, for the second reaction, it has been found that only the aliphatic aldehydes, preferably, but not necessarily, those of four or more carbon atoms, give the best results, although aromatic aldehydes will yield a product having some corrosion inhibiting properties, but still not as satisfactory as those products formulated with the aliphatic aldehydes. Heterocyclic aldehydes such as furfural are generally unsatisfactory for use in formulating my new compounds, although they do yield products having a certain amount of inhibiting powers. However, the inhibiting powers are so low that their use is not commercially practicable.

In preparing my compounds, I prefer to mix the aldehyde and the diethylenetriamine and add benzene, in order to make the solution more fluid and also to use the benzene as an azeotrope-former to carry overhead the water formed in the reaction. The mixture is then heated until water ceases to evolve overhead and may then be finished by heating at about 190° C. for about two hours in order to be quite sure that the reaction has been driven to completion, although this latter heating is not strictly necessary. Caution should be observed in adding the aldehyde to the amine as the reaction takes place spontaneously with the evolution of considerable heat and if the aldehyde is added too fast, the mixture tends to boil over. This intermediate product, when formaldehyde is used as the aldehyde, is water-soluble; however, when using a higher aldehyde such as butyraldehyde, heptaldehyde, or benzaldehyde, the product is water-insoluble, but oil-soluble.

The intermediate reaction product is then cooled to room temperature and the other aldehyde, which, as stated above, is preferably an aliphatic aldehyde, is then added. The product is then heated until water ceases to evolve overhead. The final product is water dispersible, forming a stable or clear emulsion with water, and is also oil-soluble.

Other variations on my compositions, include neutralizing them with oleic acid, where products having pronounced oil solubility are desired. I have found, however, that the oleic-acid-neutralized products are no more effective in inhibiting corrosion than the products unneutralized, and in some cases are less effective.

The effectiveness of my compositions in inhibiting the corrosiveness of oil field brines may be better and more fully understood by reference to certain tests which I have conducted using natural brines taken from producing wells together with oil from the same well. The test procedure, as hereafter described, involved a measurement of the corrosive action of these well fluids, as inhibited with the compositions described above, upon test strips of hot rolled steel, and a comparison thereof with the results obtained by subjecting identical test strips to the corrosive action of well fluids alone.

In testing the compositions, cleaned and numbered one-quart bottles were purged with natural gas. Oil saturated with hydrogen sulfide by bubbling the gas through the liquid for about three hours was added to the half-full mark on the bottle. Brine containing carbon dioxide and hydrogen sulfide in varying amounts as received from the well, was then added to almost completely fill the bottle. A quantity of our new compounds was then added to each bottle in an amount of 50 parts per million, based on the oil content of the bottle. The weighed steel strips were then affixed in such manner that the mid-point of the test strip was approximately at the interfacial level of the brine and oil.

At all times precautions were maintained to exclude air from the bottles by frequent and liberal purging with oxygen-free natural gas. The bottles containing the oil, the brine, and the strips were then mounted upon the periphery of a horizontal drum, which was slowly revolved so as to alternately bring the surface of the steel strip in contact with the oil and with the brine. At the end of two weeks the bottles were taken off the drum and the strips removed. The strips were first washed in kerosene and then methanol, and finally water, prior to cleaning. Cleaning consisted of carefully treating in one weight per cent hydrochloric acid solution for a few seconds at a time, washing with water, and thoroughly wiping with cheese cloth between each acid treatment. When the original lustre had been restored as nearly as possible with a minimum amount of acid treating, the strips were again washed in methanol followed by acetone. The dry strips were then reweighed to determine the weight loss; blanks were run to provide a basis for comparison.

Changes in the weight of the test strips during the corrosion test were taken as a measurement of the effectiveness of the inhibitor compositions, expressed as a protection percentage. Thus if the blank lost, for example, 100 mg. during the course of the test and the test strip subjected to the brine and oil containing our inhibiting compositions lost 5 mg., the per cent effectiveness would be 95 per cent. In the same manner if the test strip exposed to the uninhibited well fluids lost say 50 mg., while the loss of the test strip exposed to the inhibited well fluids was 4 mg., then the percentage of protection would be 92 per cent.

As a result of these tests it was determined that the compounds made from our preferred aldehydes showed protection percentages of over 90 per cent, whereas the reaction products of diethylenetriamine with other aldehydes showed but little efficiency.

For example, in a test in which the inhibitor was a product prepared by first reacting diethylenetriamine with benzaldehyde, and then reacting this intermediate product with heptaldehyde, the test strip in the inhibited oil-brine mixture showed a loss of 6.8 mg., whereas a control strip in the same oil-brine mixture showed a loss of 72.8 mg., giving this particular composition a protection percentage of 91 per cent. In contrast, a composition prepared by reacting diethylenetriamine with furfural, and then reacting the intermediate product with benzaldehyde, when tested as an inhibitor, showed a weight loss of 51.9 mg. on the test strip, compared to a control strip loss of 73.5 mg., a protection percentage of only 29 per cent.

It will thus be evident that corrosion may be reduced to a value of one tenth or less of the corrosion due to the natural flow of well fluids through the well tubing and gathering lines, by the incorporation of very minor quantities of our new compounds into the well fluid.

In using my improved compositions for protecting oil well tubing, casing, and other equipment which comes in contact with the corrosive oil-brine production, I find that excellent results may be obtained by injecting an appropriate quantity of a selected composition into a producing well so that it may mingle with the oil-brine mixture and come into contact with the casing, tubing, pumps, and other producing equipment. I may, for example, introduce the inhibiting composition into the top of the casing, thus causing it to flow down into the well and thence back through the tubing, etc. In general, I have found that this procedure suffices to inhibit corrosion throughout the entire system of production, and collection, even including field tankage.

The nature of the inhibiting action of my improved compositions is not fully understood, but apparently the compositions act to preferentially wet the surface of the metal equipment with oil, thus excluding brine from contact with the metal. In any event, however, no matter what the mechanics of the corrosion inhibiting may be, they are extremely and surprisingly effective in protecting metal parts from corrosion even when used in amounts of fifty parts per million or less based on the oil content of the well fluids.

It is to be understood that the improved compositions of my invention are not limited to use alone and may be employed along with other agents commonly introduced into producing oil wells for breaking emulsions, limiting scale formation, etc. It is further evident that my invention is not restricted to the use of improved compositions for inhibiting corrosion in oil wells but may be employed to perform this function in the presence of corrosive brines of other origin.

Having now described my invention, what I claim as new and useful is:

1. The process of preventing the corrosion of metals when exposed to contact with corrosive oil well fluids which comprises incorporating into the well fluids a small but sufficient quantity of a reaction product prepared by spontaneously reacting about one mol of diethylenetriamine with about one mol of an aldehyde selected from the group consisting of aliphatic aldehydes and aromatic aldehydes, heating the reaction mixture at a temperature sufficiently high, but not in excess of about 190 C., and for a period of time sufficient to drive off water formed in the reaction whereby to form an intermediate reaction product between the amine and the aldehyde, cooling the mixture, spontaneously reacting the intermediate reaction product with an additional mole of an aliphatic aldehyde, and heating at a temperature sufficiently high, but not in excess of about 190° C., and for a period of time sufficient to drive off water formed by the reaction of the added aldehyde with the intermediate reaction product and thereafter causing the well fluids to flow in contact with the metal to be protected.

2. The process of preventing the corrosion of metals when exposed to contact with corrosive oil well fluids which comprises incorporating into the well fluids a small but sufficient quantity of a reaction product prepared by spontaneously reacting about one mole of diethylenetriamine with about one mol of benzaldehyde, heating the reaction mixture at a temperature sufficiently high, but not in excess of about 190 C., and for a period of time sufficient to drive off water formed in the reaction whereby to form an intermediate reaction product between the amine and the benzaldehyde, cooling the mixture, spontaneously reacting the intermediate reaction product with an additional mol of an aliphatic aldehyde and heating at a temperature sufficiently high, but not in excess of 190° C., and for a period of time sufficient to drive off water formed by the reaction of the added aldehyde with the intermediate reaction product and thereafter causing the well fluids to flow in contact with the metal to be protected.

3. The process of preventing the corrosion of metals when exposed to contact with corrosive oil well fluids which comprises incorporating into the well fluids a small but sufficient quantity of a reaction product prepared by spontaneously reacting about one mol of diethylenetriamine with about one mol of heptaldehyde, heating the reaction mixture at a temperature sufficiently high, but not in excess of about 190° C., and for a period of time sufficient to drive off water formed in the reaction whereby to form an intermediate reaction product between the amine and the heptaldehyde, cooling the mixture, spontaneously reacting the intermediate reaction product with an additional mol of an aliphatic aldehyde, and heating at a temperature sufficiently high, but not in excess of 190° C., and for a period of time sufficient to drive off water formed by the reaction of the added aldehyde with the intermediate reaction product, and thereafter causing the well fluids to flow in contact with the metal to be protected.

4. The process of preventing the corrosion of metals when exposed to contact with corrosive oil well fluids which comprises incorporating into the well fluids a small but sufficient quantity of a reaction product prepared by spontaneously reacting about one mol of diethylenetriamine with about one mol of benzaldehyde, heating the reaction mixture at a temperature sufficiently high, but not in excess of about 190° C., and for a period of time sufficient to drive off water formed in the reaction whereby to form an intermediate reaction product between the amine and the benzaldehyde, cooling the mixture, spontaneously reacting the intermediate reaction product with an additional mol of heptaldehyde, and heating at a temperature sufficiently high, but not in excess of about 190° C., and for a period of time sufficient to drive off water formed by the reaction of the added aldehyde with the intermediate reaction product, and thereafter causing the well fluids to flow in contact with the metal to be protected.

5. The process of preventing the corrosion of metals when exposed to contact with corrosive oil well fluids which comprises incorporating into the well fluids a small but sufficient quantity of a reaction product prepared by spontaneously reacting about one mol of diethylenetriamine with about one mol of an aldehyde selected from the group consisting of aliphatic aldehydes and aromatic aldehydes, heating the reaction mixture at a temperature sufficiently high, but not in excess of 190° C., and for a period of time sufficient to drive off water formed in the reaction whereby to form an intermediate reaction product between the amine and the aldehyde, cooling the mixture, spontaneously reacting the intermediate reaction product with an additional mol of heptaldehyde, and heating at a temperature sufficiently high, but not in excess of about 190° C., and for a period of time sufficient to drive off water formed by the reaction of the added aldehyde with the intermediate reaction product, and thereafter causing the well fluids to flow in contact with the metal to be protected.

6. The process of preventing the corrosion of metals when exposed to contact with corrosive oil well fluids which comprises incorporating into the well fluids a small but sufficient quantity of a reaction product prepared by spontaneously reacting about one mol of diethylenetriamine with about one mol of formaldehyde, heating the reaction mixture at a temperature sufficiently high, but not in excess of about 190° C., and for a period of time sufficient to drive off water formed in the reaction whereby to form an intermediate reaction product between the amine and the formaldehyde, cooling the mixture, spontaneously reacting the intermediate reaction product with an additional mol of an aliphatic aldehyde and heating at a temperature sufficiently high, but not in excess of 190° C., and for a period of time sufficient to drive off water formed by the reaction of the added aldehyde with the intermediate reaction product, and thereafter causing the well fluids to flow in contact with the metal to be protected.

WILLIAM B. HUGHES.

References Cited in the file of this patent

UNITED STATES PATENTS

| Number | Name | Date |
| --- | --- | --- |
| 2,496,596 | Moyer | Feb. 7, 1950 |
| 2,596,273 | Moyer et al. | May 13, 1952 |